US010587868B2

(12) United States Patent
Yun et al.

(10) Patent No.: US 10,587,868 B2
(45) Date of Patent: Mar. 10, 2020

(54) VIRTUAL REALITY SYSTEM USING MIXED REALITY AND IMPLEMENTATION METHOD THEREOF

(71) Applicant: KYUNGPOOK NATIONAL UNIVERSITY INDUSTRY-ACADEMIC COOPERATION FOUNDATION, Daegu (KR)

(72) Inventors: Byoung-Ju Yun, Daegu (KR); Sang-Hoon Lee, Daegu (KR)

(73) Assignee: KYUNGPOOK NATIONAL UNIVERSITY INDUSTRY-ACADEMIC COOPERATION FOUNDATION, Daegu (KR)

(*) Notice: Subject to any disclaimer, the term of this patent is extended or adjusted under 35 U.S.C. 154(b) by 0 days.

(21) Appl. No.: 16/302,094

(22) PCT Filed: May 25, 2017

(86) PCT No.: PCT/KR2017/005477
§ 371 (c)(1),
(2) Date: Nov. 15, 2018

(87) PCT Pub. No.: WO2017/204581
PCT Pub. Date: Nov. 30, 2017

(65) Prior Publication Data
US 2019/0156586 A1    May 23, 2019

(30) Foreign Application Priority Data

May 26, 2016   (KR) .................... 10-2016-0064970

(51) Int. Cl.
*H04N 13/344*  (2018.01)
*G06T 7/73*  (2017.01)
(Continued)

(52) U.S. Cl.
CPC .......... *H04N 13/344* (2018.05); *G02B 27/00* (2013.01); *G02B 27/0093* (2013.01);
(Continued)

(58) Field of Classification Search
CPC .................................................. G06T 19/006
See application file for complete search history.

(56) References Cited

U.S. PATENT DOCUMENTS

2007/0184422 A1    8/2007  Takahashi
2010/0245387 A1*   9/2010  Bachelder ............ G06T 19/006
                                              345/633
(Continued)

FOREIGN PATENT DOCUMENTS

JP      2013-218535 A    10/2013
KR   10-2006-0127251 A   12/2006
(Continued)

OTHER PUBLICATIONS

International Search Report for PCT/KR2017/005477 dated Aug. 24, 2017 from Korean Intellectual Property Office.

*Primary Examiner* — Phi Hoang
(74) *Attorney, Agent, or Firm* — Revolution IP, PLLC

(57) ABSTRACT

A virtual reality system using mixed reality according to the present invention includes: a chroma-key environment booth in which a chroma-key screen is formed in a space corresponding to a viewing range of a user; a depth camera unit installed on an upper surface of the chroma-key environment booth and capturing the user and generating depth image information; an HMD device in which a stereoscopic camera worn on a head of the user and performing capturing at positions corresponding to both eyes of the user is positioned, and a head tracking marker is positioned on an upper end of the stereoscopic camera; and a mixed reality processing device detecting the head tracking marker positioned in the HMD device by receiving the depth image (Continued)

information and detecting position and rotation values of the head of the user in an actual environment.

8 Claims, 11 Drawing Sheets

(51) Int. Cl.
| | |
|---|---|
| H04N 13/239 | (2018.01) |
| H04N 13/279 | (2018.01) |
| H04N 13/383 | (2018.01) |
| G06F 3/01 | (2006.01) |
| G02B 27/00 | (2006.01) |
| G02B 27/01 | (2006.01) |
| G06T 7/593 | (2017.01) |
| G06T 19/00 | (2011.01) |
| H04N 9/75 | (2006.01) |

(52) U.S. Cl.
CPC ........... *G02B 27/01* (2013.01); *G02B 27/017* (2013.01); *G06F 3/011* (2013.01); *G06F 3/012* (2013.01); *G06T 7/593* (2017.01); *G06T 7/73* (2017.01); *G06T 19/006* (2013.01); *H04N 13/239* (2018.05); *H04N 13/279* (2018.05); *H04N 13/383* (2018.05); *G02B 2027/0138* (2013.01); *G06T 2200/04* (2013.01); *G06T 2207/10012* (2013.01); *G06T 2207/10028* (2013.01); *G06T 2207/30201* (2013.01); *G06T 2207/30204* (2013.01); *G06T 2207/30244* (2013.01); *H04N 9/75* (2013.01)

(56) References Cited

U.S. PATENT DOCUMENTS

| | | | |
|---|---|---|---|
| 2011/0153045 A1* | 6/2011 | Ryckman | G10H 1/361 700/94 |
| 2013/0222427 A1 | 8/2013 | Heo et al. | |
| 2015/0094142 A1* | 4/2015 | Stafford | G06F 3/04815 463/31 |
| 2015/0258432 A1* | 9/2015 | Stafford | A63F 13/213 463/32 |
| 2015/0317853 A1* | 11/2015 | Reymann | G07C 9/00111 340/5.7 |
| 2015/0364109 A1* | 12/2015 | Jain | G09G 5/006 345/156 |
| 2018/0151000 A1* | 5/2018 | Liv | G06F 3/012 |

FOREIGN PATENT DOCUMENTS

| | | |
|---|---|---|
| KR | 10-2013-0099317 A | 9/2013 |
| KR | 10-2014-0001167 A | 1/2014 |
| KR | 10-2016-0000986 A | 1/2016 |

\* cited by examiner

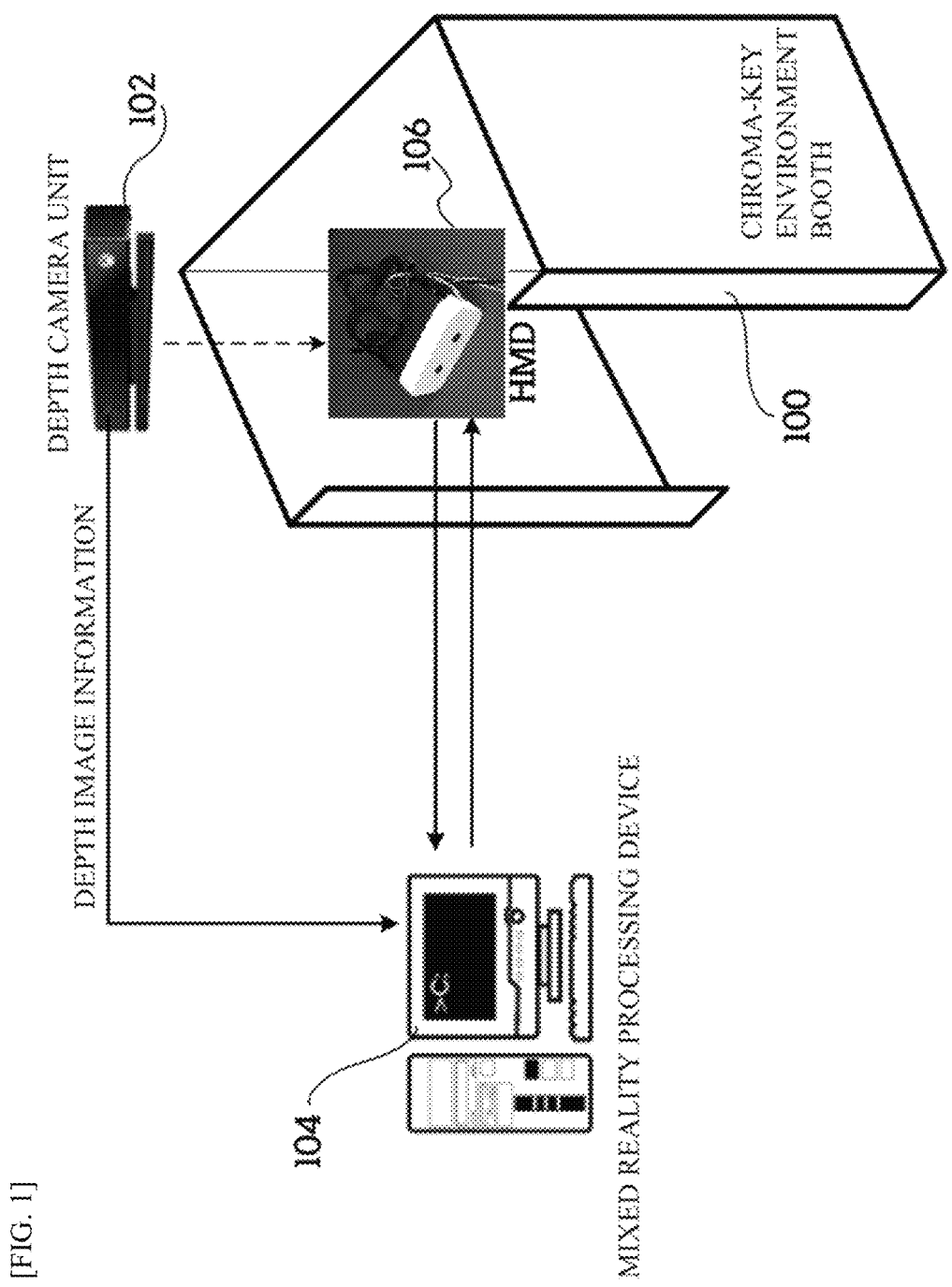
[FIG. 1]

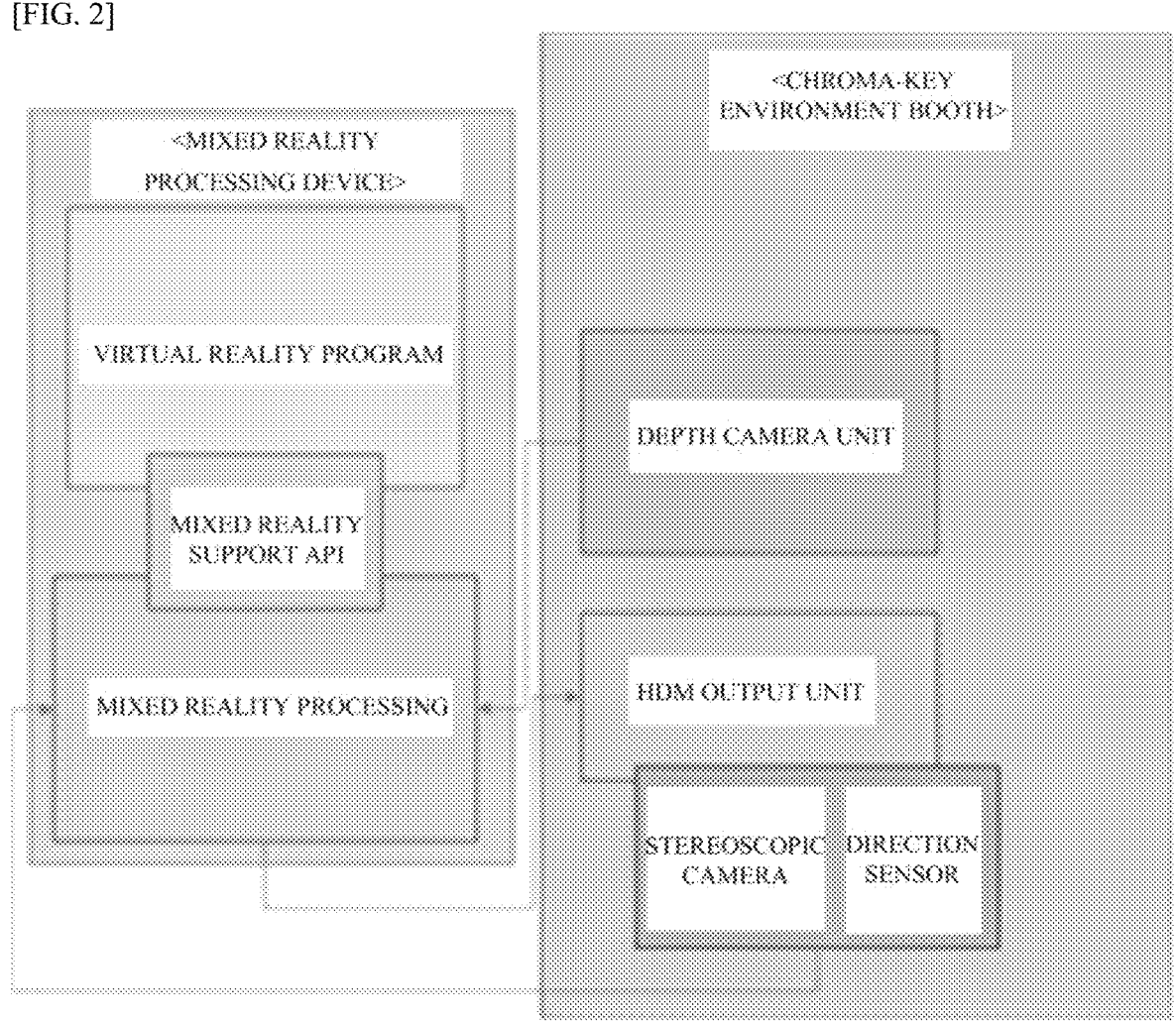
[FIG. 2]

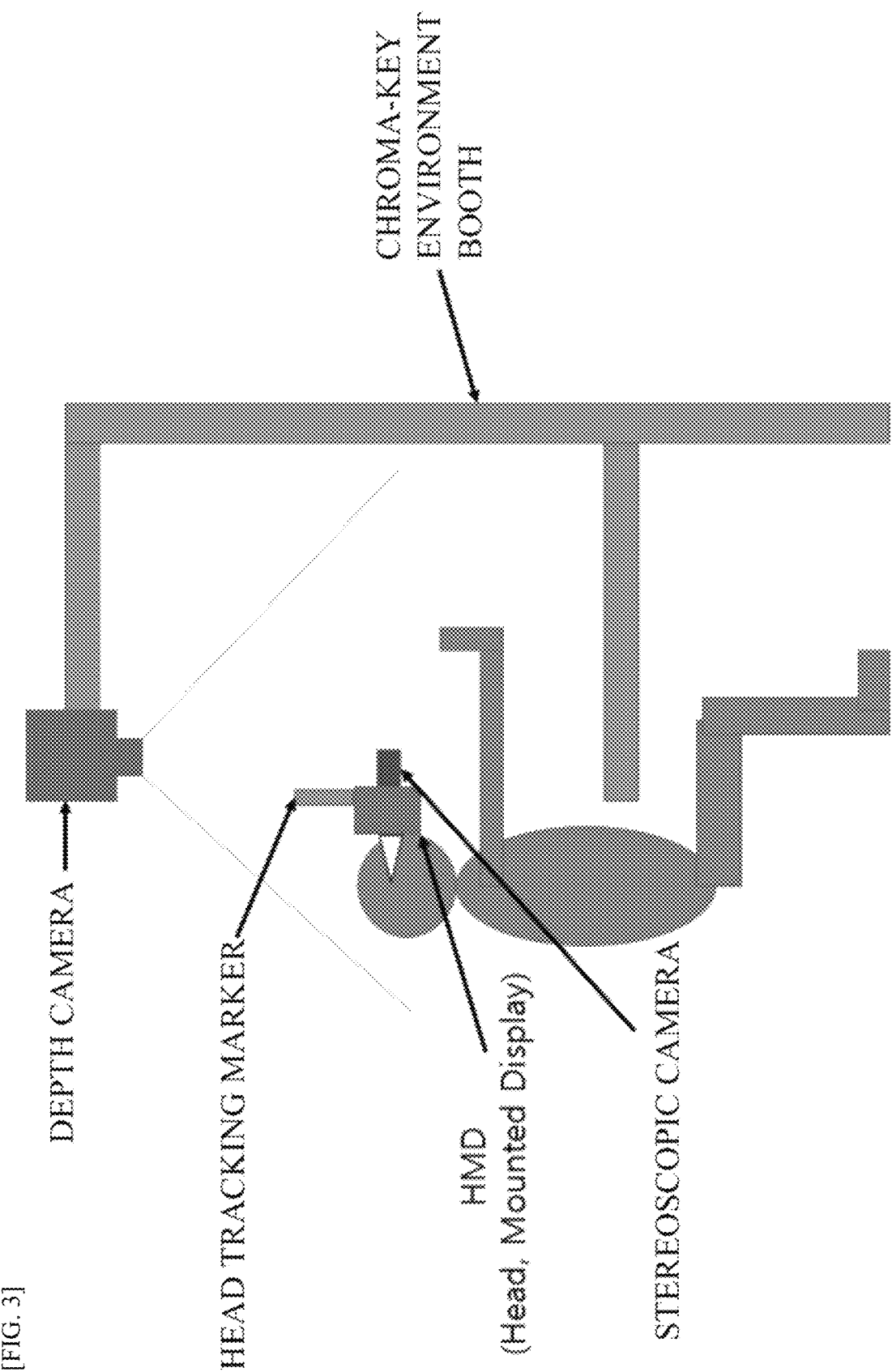
[FIG. 3]

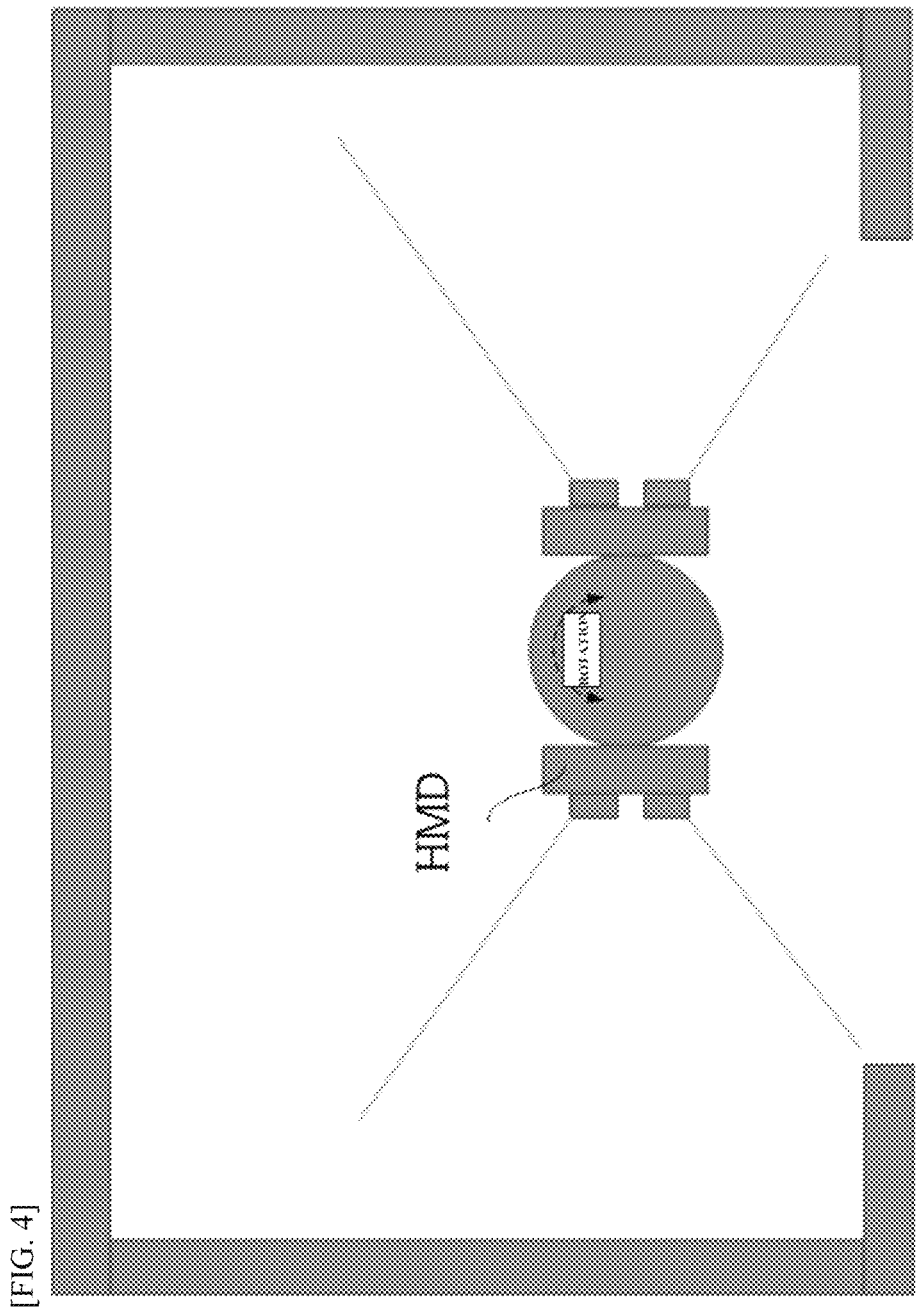
[FIG. 4]

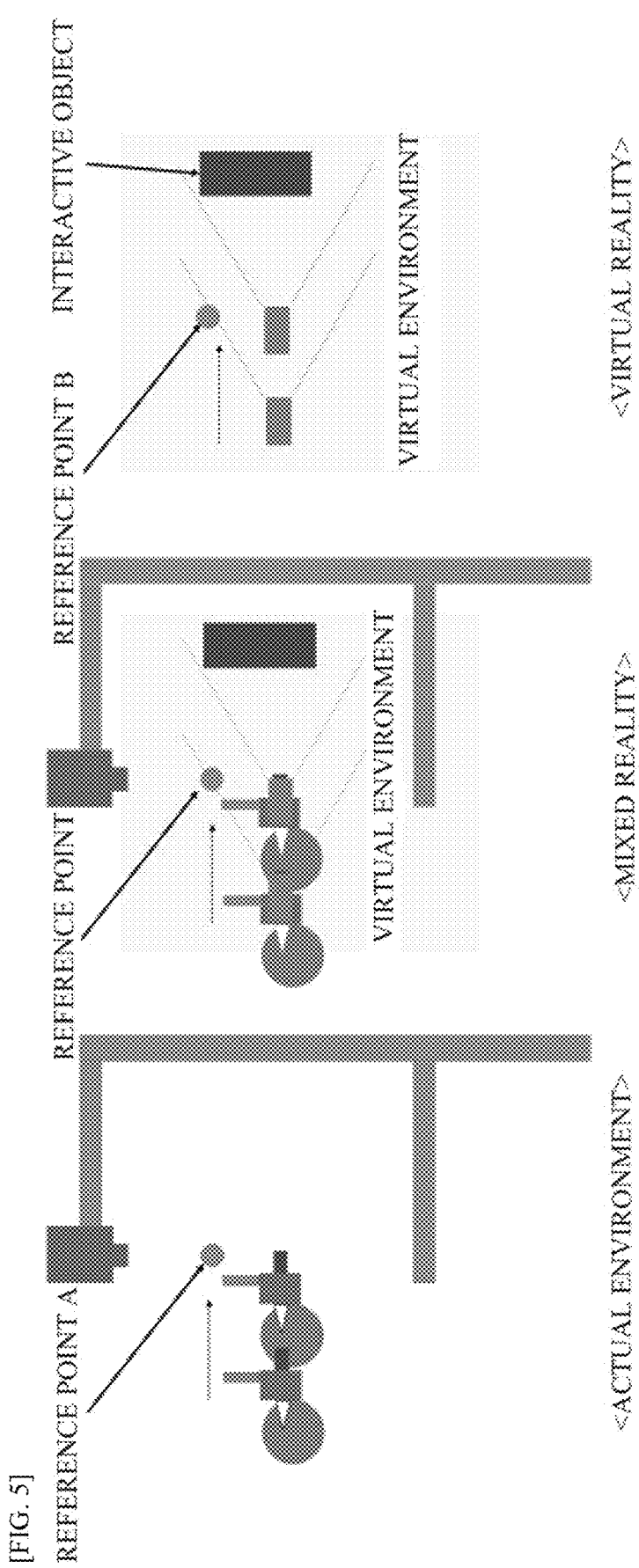

[FIG. 6]
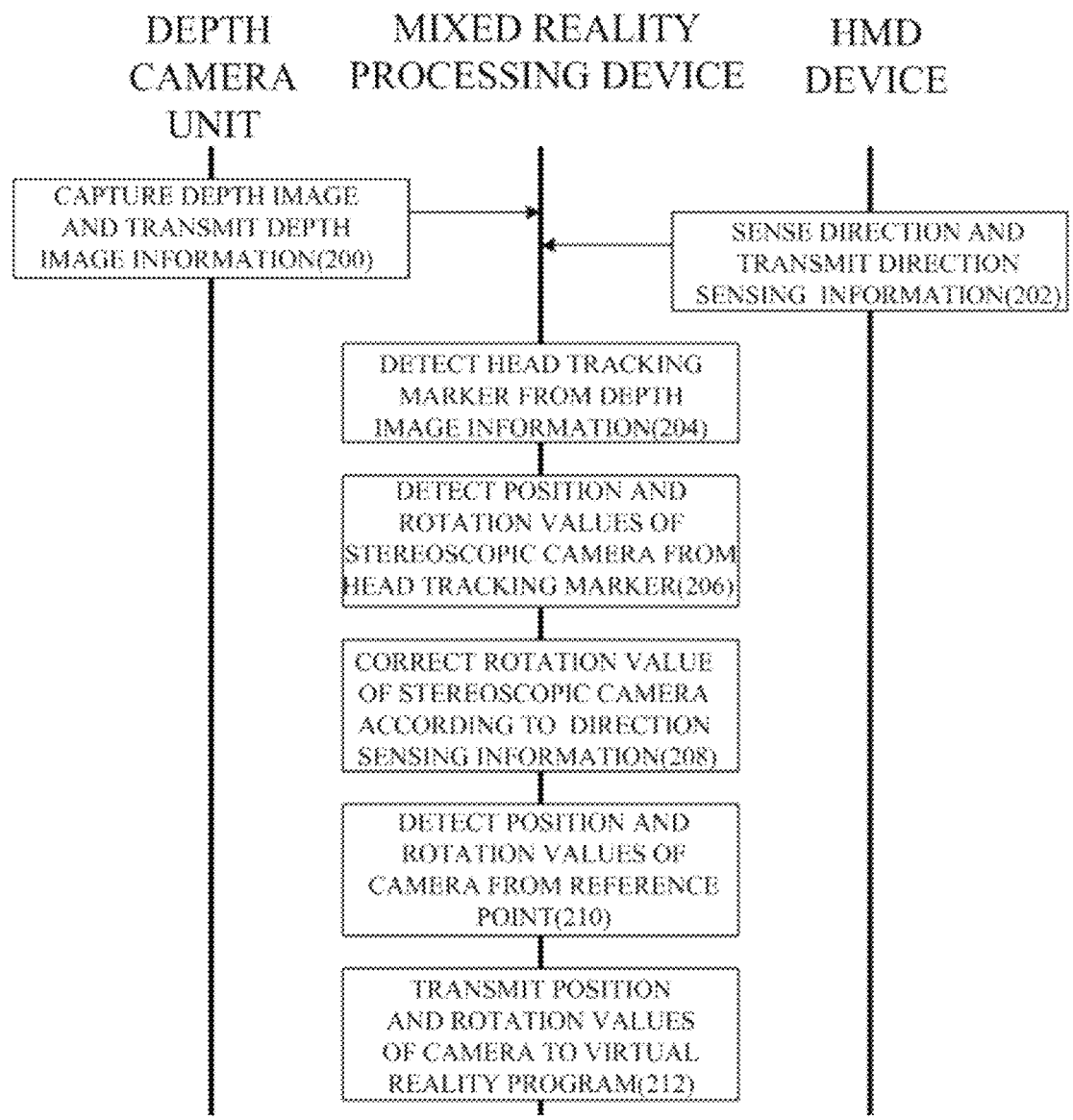

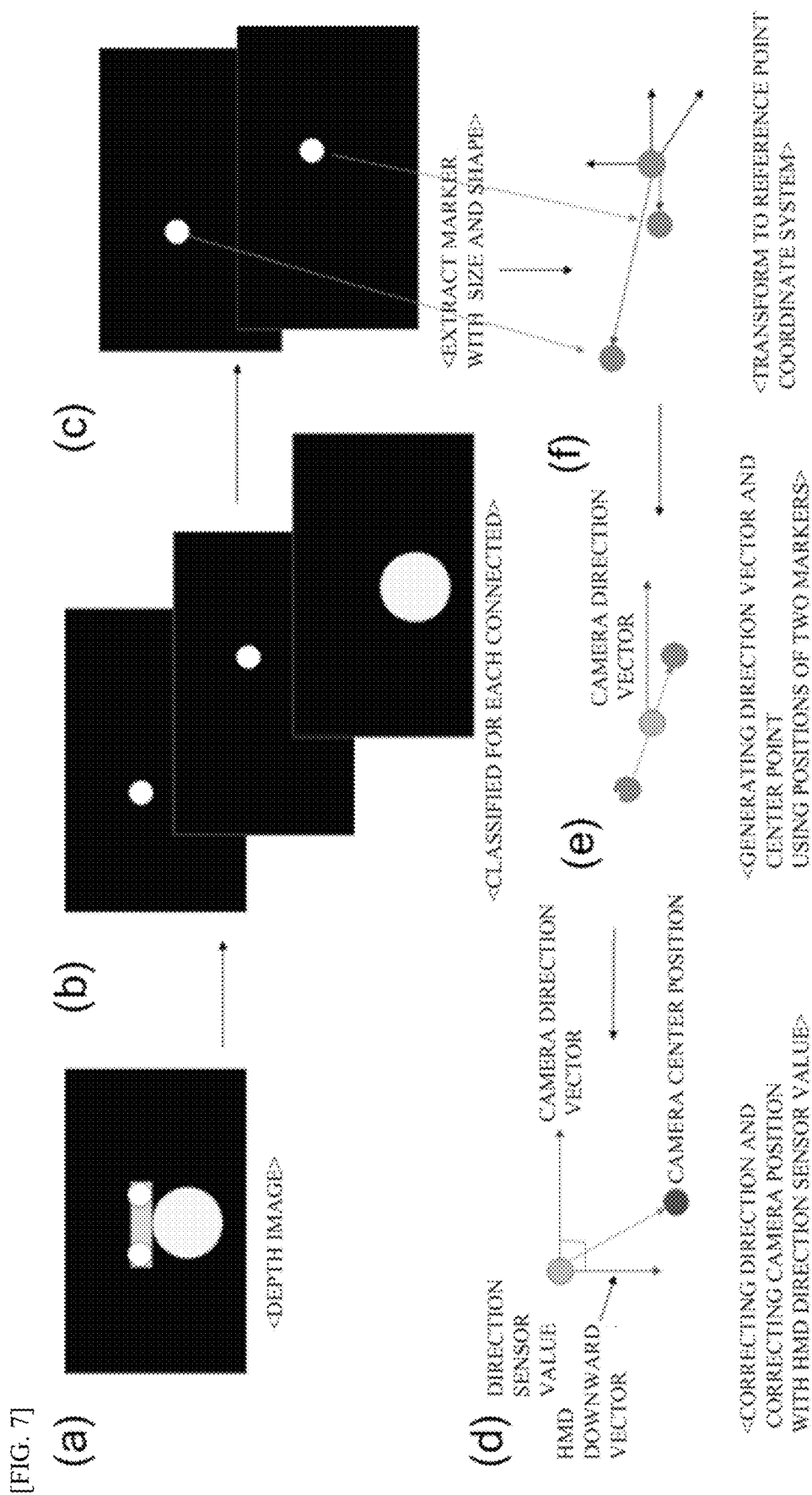

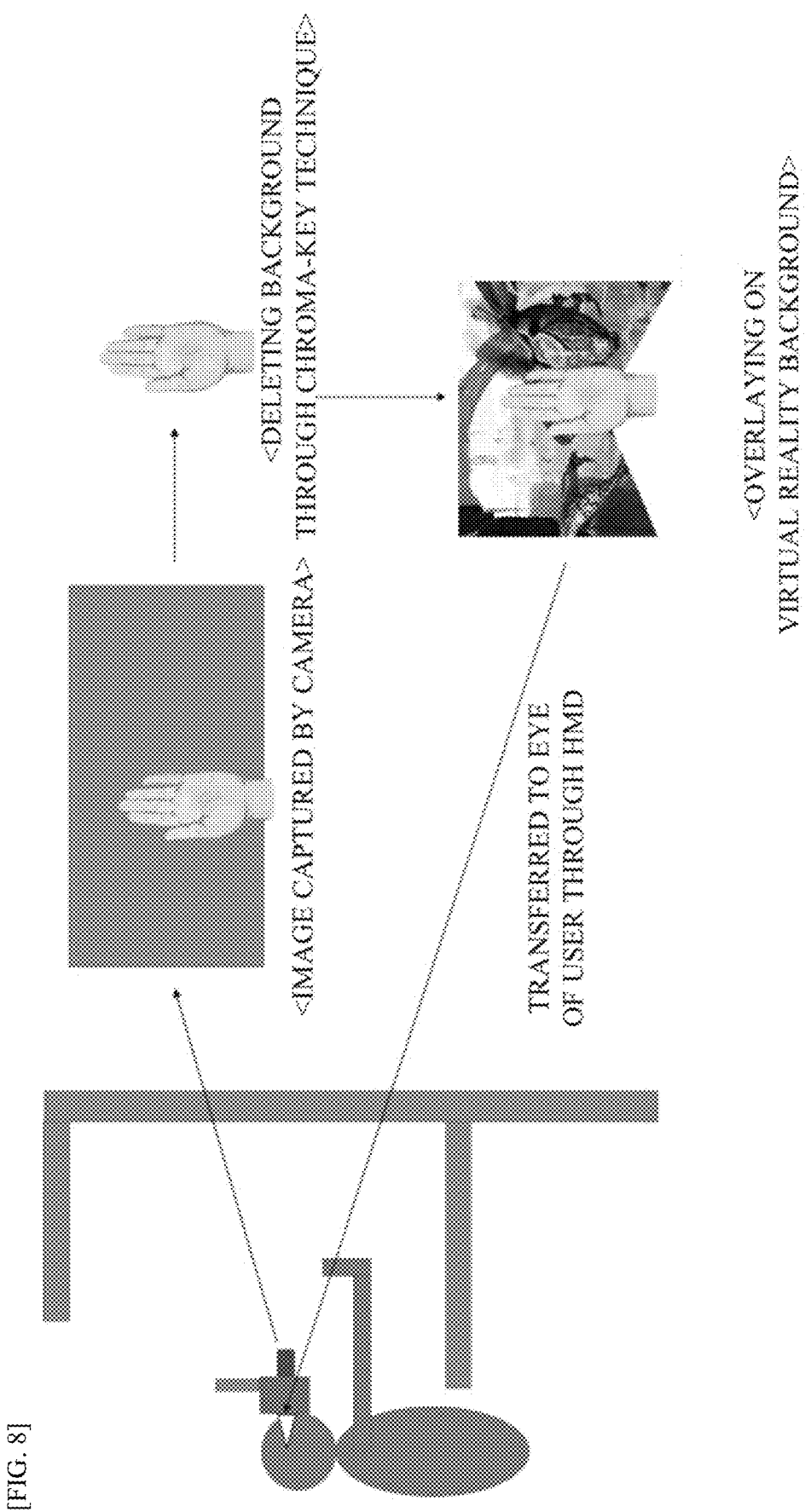

[FIG. 9]
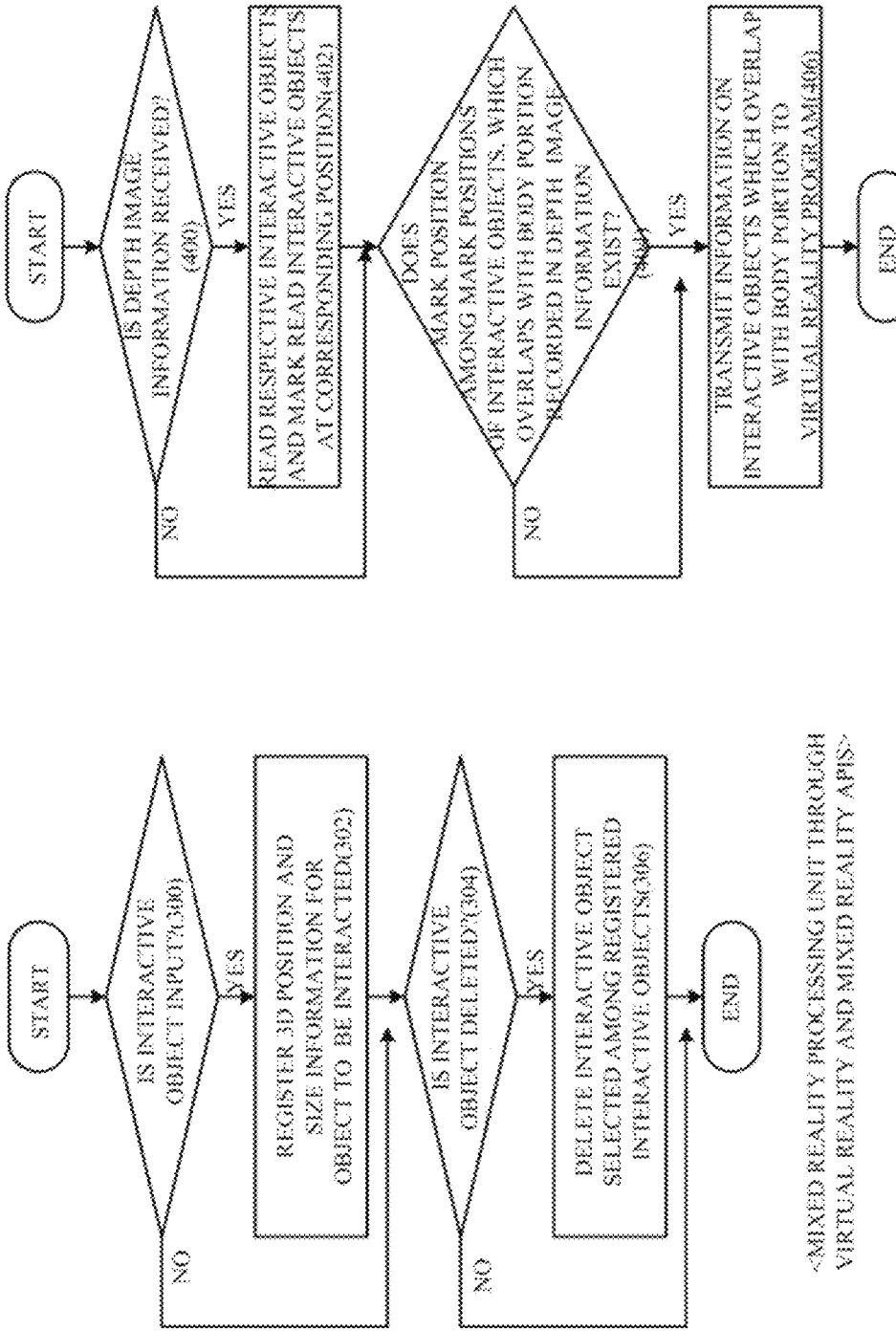

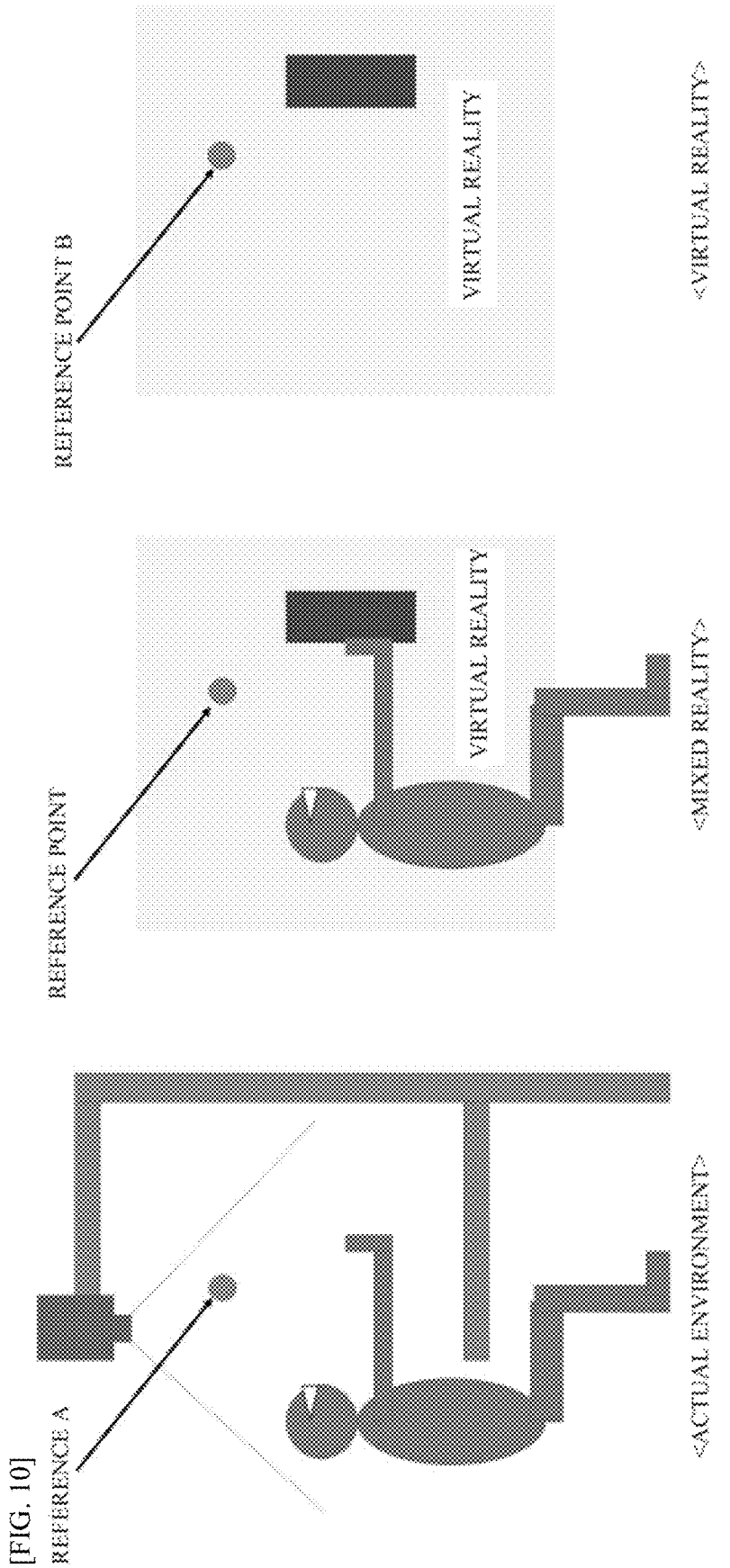

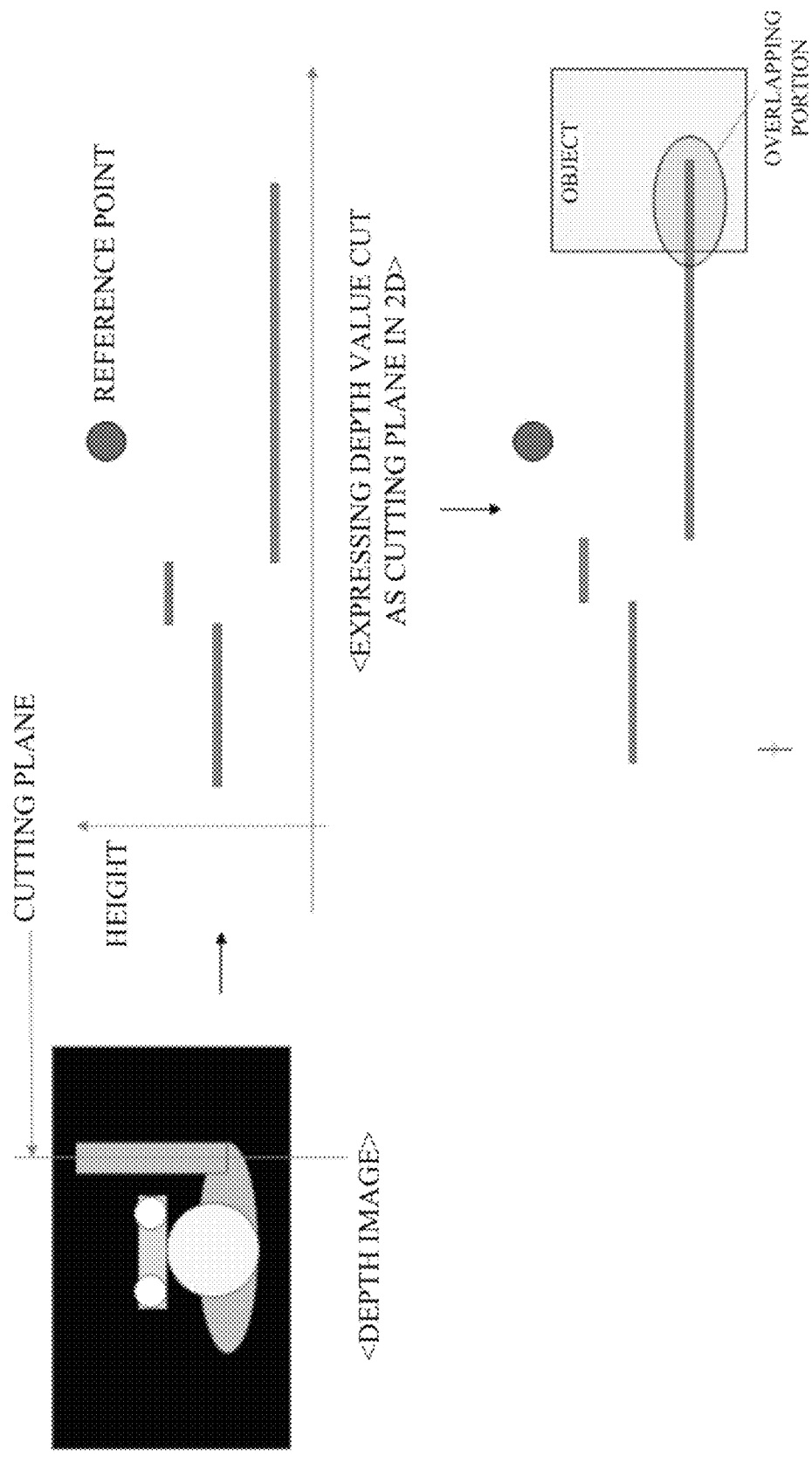
[FIG. 11]

VIRTUAL REALITY SYSTEM USING MIXED REALITY AND IMPLEMENTATION METHOD THEREOF

TECHNICAL FIELD

The present invention relates to a virtual reality implementation technology, and more particularly, to a virtual reality system using a mixed reality, which can maximize realism by matching a position of a camera within a virtual reality and a viewing angle of a user by recognizing a body of a user and substituting the body of the user into the virtual reality and by tracking a head of the user when providing a 3D environment corresponding to a motion of the head of the user and an implementation method thereof.

BACKGROUND ART

Virtual reality is collectively referred to as an interface between a human and a computer, which produces a specific environment or situation with stereoscopic 3D contents through the computer and creates as if a person who uses the 3D contents interacts with an actual surrounding situation or environment, etc.

In general, a three-dimensional effect perceived by the person is achieved by complex operation of a degree of thickness change of a lens depending on the position of an observed object, an angle difference between both eyes and the object, a difference in position and shape of the object seen in right and left eyes, a disparity caused depending on movement of the object, an effect by various psychologies and memories, and the like.

The most important factor through which the person feels the 3D effect among them is a binocular disparity caused as both eyes of the person are horizontally separated from each other by approximately 6.5 cm. That is, the person views the object with the angle difference for the object by the binocular disparity and images input into respective eyes have different phases due to such a difference and when both images are transferred to a brain through a retina, the brain accurately fuses the two pieces of information, and as a result, a user may feel an original 3D stereoscopic image. These stereoscopic 3D contents have been widely used in various media fields and have been popular with consumers. For example, 3D movies, 3D games, and experience displays are representative.

As described above, in addition to the universalization of virtual reality technology 3D contents, there is a multilateral need to develop a technology capable of providing a more immersive virtual reality service.

DISCLOSURE

Technical Problem

An object of the present invention is to provide a virtual reality system using a mixed reality, which can maximize realism by matching a position of a camera within a virtual reality and a viewing angle of a user by recognizing a body of a user and substituting the body of the user into the virtual reality and by tracking a head of the user when providing a 3D environment corresponding to a motion of the head of the user and an implementation method thereof.

Further, another object of the present invention is to provide a virtual reality system using mixed reality, which can maximize realism by using a reference point indicating the same position within the mixed reality and virtual reality when an interactive object input by a user is positioned within the virtual reality and an implementation method thereof.

Technical Solution

In order to achieve the objects, a virtual reality system using mixed reality according to the present invention includes: a chroma-key environment booth in which a chroma-key screen is formed in a space corresponding to a viewing range of a user; a depth camera unit installed on an upper surface of the chroma-key environment booth and capturing the user and generating depth image information; an HMD device in which a stereoscopic camera worn on a head of the user and performing capturing at positions corresponding to both eyes of the user is positioned, and a head tracking marker is positioned on an upper end of the stereoscopic camera, and which is configured by an HMD output unit outputting an image onto planes corresponding to the both eyes of the user; and a mixed reality processing device detecting the head tracking marker positioned in the HMD device by receiving the depth image information and detecting a position and a rotation value of the head of the user in an actual environment, applying the detected position and rotation values to a virtual reality rendering camera for virtual reality generating output image information output to the HMD device to correspond to the position and the rotation value, and overlaying image information for a body of the user, which is captured by the stereoscopic camera on the output image information.

Advantageous Effects

According to the present invention, it is possible to maximize realism by matching a position of a camera within a virtual reality and a viewing angle of a user by recognizing a body of a user and substituting the body of the user into the virtual reality and by tracking a head of the user when providing a 3D environment corresponding to a motion of the head of the user.

Further, according to the present invention, it is possible to maximize realism by using a reference point indicating the same position within the mixed reality and virtual reality when an interactive object input by a user is positioned within the virtual reality.

DESCRIPTION OF DRAWINGS

FIG. 1 is a physical configuration diagram of a virtual reality system using a mixed reality according to an embodiment of the present invention;

FIG. 2 is an abstract configuration diagram of the virtual reality system of FIG. 1;

FIGS. 3 and 4 are diagrams schematically illustrating a structure of a mixed reality booth of FIG. 1;

FIG. 5 is a diagram schematically illustrating a process of implementing the mixed reality according to the present invention;

FIG. 6 is a diagram illustrating a process of detecting position and rotation values of a camera according to the present invention;

FIG. 7 is a diagram illustrating a process of correcting the rotation value of the camera;

FIG. 8 is a diagram schematically illustrating a mixed reality implementing process according to the present invention;

FIG. 9 is a diagram illustrating a process of inputting and marking an interactive object in virtual reality according to the present invention; and FIGS. 10 and 11 are diagrams illustrating a process of implementing an interactive object in virtual reality according to the present invention.

BEST MODE

Advantages and features of the present disclosure, and methods for accomplishing the same will be more clearly understood from embodiments described in detail below with reference to the accompanying drawings. However, the present invention is not limited to embodiments described herein and may be embodied in other forms. However, the exemplary embodiments are provided to those skilled in the art to describe the technical spirit of the present invention specifically enough to easily execute the technical spirit of the present invention.

In the drawings, the embodiments of the present invention are not limited to an illustrated specific form and exaggerated for clarity. Further, like reference numerals designate like elements throughout the specification.

Further, singular forms include even plural forms unless the context clearly indicates otherwise. Further, it is to be understood that a component, a step, an operation, and an element mentioned as the terms "comprise" or "comprising" used in the specification means presence or addition of one or more other components, steps, operations, elements, and devices.

The present invention provides a virtual reality service using a highly immersive mixed reality by recognizing a user's body to substitute the recognized user's body into the virtual reality and providing a 3D environment corresponding to the motion of the user's head.

In particular, the present invention provides a virtual reality service that maximizes realism by tracking a user's head to match a viewing angle of a user with a camera position in the virtual reality.

In addition, the present invention may make various user's needs to be satisfied by utilizing a reference point indicating the same position in a mixed reality and a virtual reality when an interactive object input by a user is located in the virtual reality. For example, it is possible to perform operations such as touching the interactive object input by the user on the mixed reality.

Hereinafter, preferred embodiments of the present invention will be described in detail with reference to the accompanying drawings.

FIG. 1 is a block configuration diagram of a virtual reality system using a mixed reality according to a preferred embodiment of the present invention, FIG. 2 is an abstract configuration diagram of the virtual reality system, and FIGS. 3 and 4 are a side view and a top view of a chroma-key environment booth.

Referring to FIGS. 1 to 4, the virtual reality system includes a chroma-key environment booth 100, a depth camera unit 102, a mixed reality processing unit 104, a stereoscopic camera and a head tracking marker mounting type head mounted display (HMD) device 106.

The chroma-key environment booth 100 is formed in a rectangular parallelepiped box shape having an opened side, and one side thereof is opened. The user may enter and be located at the center of the chroma-key environment booth 100 through one opened side of the chroma-key environment booth 100. In particular, a chroma-key screen is formed on the inner surface of the chroma-key environment booth 100, and as shown in FIG. 4, even when the user turns the head to the left and right to have a view, the chroma-key screen is formed with respect to a space capable of having a camera viewing angle of 180° or more, that is, 180+to be chroma-key-processed. In addition, the depth camera unit 102 is installed on the upper surface of the chroma-key environment booth 100, and the height of the chroma-key environment booth 100 is formed as a height so that the user's hand may be captured by the depth camera unit 102 when the user stretches the hand. Here, in the preferred embodiment of the present invention, only the example in which the chroma-key environment booth 100 has a rectangular parallelepiped shape is illustrative, but it is apparent to those skilled in the art by the present invention that the chroma-key environment booth 100 may be fabricated in various forms such as a cylindrical shape. The chroma-key screen is a screen that forms a blue screen zone, and the chroma-key means a method of disposing a person or an object in front of a light blue screen, capturing the person or object using a color camera, and fitting the subject image to a very different screen. When blue-based colors are used for the subject to be fitted, special effects may not be exhibited, but the blue-based colors are consciously used to exhibit special effects. Since the technical processes are performed in an electronic circuit, the processes may be instantly synthesized only by a switch operation, so that the present invention is suitable for realization of the mixed reality.

Accordingly, the chroma-key screen applied to the embodiment of the present invention is formed such that all wall surfaces, a ceiling, and a floor are colored by a uniform blue color, and a space is secured so that a person or an object may take a motion in the space. In addition, an illumination system may be installed around the chroma-key screen to form illumination light so that colors may uniformly enter the camera.

The depth camera unit 102 is an operation recognition camera and is installed on the upper surface of the chroma-key environment booth 100 and is disposed at a position where that user's body and a head tracking marker installed on the HMD unit 106 may be captured. The depth camera unit 102 corresponds to a new concept motion recognition camera in which a Kinect device is adopted and the body and voice of a person are detected and reflected in a monitor screen as they are without a separate controller. In the embodiment of the present invention, the body of the user who wears the HMD device 106 and the head tracking marker are three-dimensionally recognized and imaged through the depth camera unit 102 to provide coordinate data to be matched with a world coordinate system in the virtual reality.

The HMD device 106 is a display device to be worn on the person' head and worn on the user's head to display the mixed reality in which a real environment and the virtual reality are mixed at a position close to the user's eyes. The HMD device 106 is configured by a stereoscopic camera, two head tracking markers positioned at upper sides of the stereoscopic camera, respectively, a direction sensor and an HMD output device. As shown in FIG. 3, the head tracking marker indicates the motion of the user's head in the form of a bar located between two eyes of the user and is captured by the depth camera unit 102 to be provided to the mixed reality processing device 104. The stereoscopic camera is provided to correspond to two eyes of the user and captures image information of a front face that may be acquired in each of the two eyes of the user, for example, a user's body such as a user's hand is captured and provided to the mixed reality processing device 104. The direction sensor is located between the two eyes of the user and senses the direction of the user's head and provides the resulting sensing information to the mixed reality processing device 104. The HMD output device displays output image data provided by the mixed reality processing device 104 and provides the displayed output image data to the two eyes of the user.

The mixed reality processing device 104 is a data processing device such as a computer, and generates output image data enabling the mixed reality using depth image information provided by the depth camera 102, stereo capturing information and direction sensing information provided by the stereoscopic camera of the HMD device 106, and content information for the virtual reality to output the generated output image data to a HMD output device of the HMD device 106. In particular, the mixed reality processing device 104 detects the head tracking marker from the depth image information provided by the depth camera 102 according to the present invention to detect a position and a rotation value of the stereoscopic camera indicating a user's view, corrects the rotation value according to the direction sensing information, and then generates output image data for the mixed reality by applying position and rotation value information of the stereoscopic camera to a virtual reality rendering camera in the content information for the virtual reality and overlaying stereo capturing information provided by the stereoscopic camera. Here, the applying of the position and rotation value information of the stereoscopic camera to the rendering camera means that the stereoscopic camera serves as the eye of the user of the real environment in the real environment and the rendering camera serves as the eye of the user in the virtual reality, and thus the rendering camera is adjusted so that the two cameras look at the same place and are positioned at the same position.

The mixed reality processing device 104 is configured by a virtual reality program for changing position and rotation values of the camera in the content information, a mixed reality support API unit through virtual reality and mixed reality APIs, and a mixed reality processing unit for the mixed reality using the depth image information.

The operation of the virtual reality system using the mixed reality according to the preferred embodiment of the present invention will be divided and described into a process of detecting the position and rotation values of the camera and a process of inputting and displaying interactive objects in the virtual reality.

<Process of Detecting Position and Rotation Values of Camera>

The process of detecting the position and rotation values of the camera during the operation of the virtual reality system using the mixed reality according to the present invention will be described with reference to FIGS. 5 to 8.

In the present invention, the mixed reality is implemented by capturing a user's body by the stereoscopic camera attached to the HMD device 106, separating a background and the user's body by using a chroma-key technique, and adding and displaying the separated user's body to the virtual reality environment. This leads the same effect as the user exists in the virtual reality and may directly view the user's body position when interacting with the object in the virtual reality, so that the user may be more naturally immersed in the virtual reality.

FIG. 5 illustrates a conceptual diagram of a process of implementing the mixed reality according to the present invention. The present invention implements the mixed reality by determining position and rotation values and a direction of the user's head to apply the determined values to a virtual reality rendering camera of the virtual reality. In this application, the values are set based on relative positions and directions to predetermined reference points A and B. In particular, the reference point A is fixed to the real environment, and the reference point B may be moved by the movement of a virtual user in the virtual reality, and the two reference points indicate the same position in the virtual reality and the reality.

The process of detecting the position and rotation values of the camera by head tracking according to the present invention will be described with reference to FIG. 6.

The depth camera unit 102 is installed on the upper surface of the chroma-key environment booth 100 to perform capturing in a direction of looking down on the user to generate depth image information and provide the depth image information to the mixed reality processing device 104 (step 200).

The HMD device 106 senses the direction of the user's head through the direction sensor to provide direction sensing information according to the sensing to the mixed reality processing device 104 (step 202).

The mixed reality processing device 104 detects the head tracking marker from the depth image information, and detects position and rotation values of the stereoscopic camera from the detected head tracking marker (steps 204 and 206).

Thereafter, the mixed reality processing device 104 corrects the rotation value of the stereoscopic camera according to the direction sensing information from the HMD device 106 (step 208). The process of correcting the rotation value is as shown in FIG. 7.

When the rotation value is corrected, the mixed reality processing unit 104 converts the rotation value to the position and rotation values of the camera for the reference point fixed to the virtual reality, and provides the converted camera position and rotation value information to a virtual reality program (step 212). The virtual reality program changes output image information among the contents according to the camera position and rotation value information, and provides the virtual reality corresponding to the user's motion to the user.

FIG. 7 illustrates a process of extracting camera position and rotation values from depth image information. FIG. 7(*a*) shows depth image information. FIG. 7(*b*) shows separating objects from the depth image information, and FIG. 7(*c*) shows detecting a head tracking marker by detecting objects belonging to a similar range of predetermined sizes and shapes of the separated objects. In addition, FIG. 7(*d*) shows a direction vector indicated by the direction sensing value by the direction sensor, FIG. 7(*e*) shows a process of generating a direction vector and a center point using the positions of the two markers, and FIG. 7(*f*) shows a process of changing to a relative coordinate system with respect to the reference point.

FIG. 8 illustrates a mixed reality output process. In the outputting of the mixed reality according to the present invention, final output image information is generated and output by using the same reference point in the real environment and the virtual reality, fitting equally a position, a direction, and a field of view (FOV) of the camera based on the reference point, and bringing the user's body part from the chroma-key capturing image received through the stereoscopic camera and overlaying the user's body part on the image information of the virtual reality.

<Process of Inputting and Displaying Interactive Object in Virtual Reality>

Then, a process of inputting and displaying an interactive object in a virtual reality according to the present invention will be described with reference to FIGS. 9 to 11.

In the present invention, when an object to be interacted is generated within a user range in a virtual reality, three-dimensional position and size information of the object to be interacted is transmitted to the mixed reality system as relative coordinates with respect to the reference point. The mixed reality system performs confirmation of whether the interaction occurs in contrast to the object information and the depth image information transmitted from the depth camera. Thereafter, when the interaction occurs, the interaction is transmitted to the virtual reality program.

FIG. 9 illustrates a process of processing a user input according to a preferred embodiment of the present invention.

When the input of the interactive object is requested (step 300), the mixed reality processing device 104 receives three-dimensional position and size information of an object to be interacted and stores the received information in a storage device (step 302), and the position is input as relative coordinates of the reference points matched in the virtual reality and the real environment.

When the deletion of the prestored interactive object is requested (step 304), the mixed reality processing device 104 deletes the delete-requested interactive object from the storage device or the like (step 306).

When the depth image information is received, the mixed reality processing device 104 detects the user's body based on the depth image information and reads the interactive objects from the storage device or the like to insert the objects to output image information so as to be displayed on the corresponding position (step 402).

Thereafter, the mixed reality processing device 104 checks whether there is a display position overlapped with a body part recorded in the depth image information among the display positions of the interactive objects (step 404). The mixed reality processing device 104 checks whether there is a display position overlapped with a body part of the user detected through the depth image information among the display positions of the interactive objects (step 404). The mixed reality processing device 104 transmits information about interactive objects overlapped with the body part to the virtual reality program so that the interactive objects may provide a reaction such as a deformation according to contact with the body (step 406).

FIG. 10 is a diagram illustrating touching the interactive objects by the user in the mixed reality by coupling interactive objects displayed through the virtual reality by the user in the real environment according to the present invention. In the real environment and the virtual reality, it is possible to provide a more realistic virtual reality to the user using the same reference point.

FIG. 11 illustrates a process of detecting that an object and a user's body are overlapped with each other according to the present invention. The position and height information of a user's body with respect to an area where an object is positioned is detected through depth image information, and when the object is positioned in the area corresponding to the position and the height, it is determined that the object and the user's body are overlapped with each other.

While the present invention has been illustrated and described with respect to the specific embodiments thereof, it will be easily known by those skilled in the art that various changes and modifications may be made without departing from the spirit and scope of the invention as defined by the appended claims.

EXPLANATION OF REFERENCE NUMERALS AND SYMBOLS

100: Chroma-key environment booth
102: Depth camera unit
104: Mixed reality processing device
106: HMD device

The invention claimed is:

1. A virtual reality system using mixed reality, comprising:
    a chroma-key environment booth in which a chroma-key screen is formed in a space corresponding to a viewing range of a user;
    a depth camera unit vertically installed on an upper surface of the chroma-key environment booth and capturing the user and generating depth image information;
    a head mounted display (HMD) device having a stereoscopic camera, a head tracking marker, a direction sensor, and a HMD output unit,
        the stereoscopic camera provided to correspond to both eyes of the user and located in front portion of the HMD device,
        the head tracking marker located on an upper end of the stereoscopic camera,
        the direction sensor located between the two eyes of the user and configured to sense a direction of the user's head, and
        the HMD output unit configured to output an image onto planes corresponding the both eyes of the user; and
    a mixed reality processing device
        configured to detect the head tracking marker positioned in the HMD device by receiving the depth image information,
        configured to detect a position and a rotation value of the head of the user in an actual environment,
        configured to correct the rotation value according to a direction sensing value detected by the direction sensor,
        configured to apply the detected position value and the corrected rotation value to a virtual reality rendering camera for virtual reality generating output image information output to the HMD device to correspond to the position value and the corrected rotation value,
        configured to overlay image information for a body of the user, which is captured by the stereoscopic camera on the output image information, and
        configured to match a reference point in an actual environment, which is marked in the chroma-key environment booth and a reference point in the output image information for the virtual reality.

2. The virtual reality system using mixed reality of claim 1, wherein a space corresponding to the viewing range is acquired by adding a capturing angle of the stereoscopic camera to a predetermined angle.

3. The virtual reality system using mixed reality of claim 1, wherein the direction sensor is configured to detect a direction corresponding to a visual field of the user.

4. The virtual reality system using mixed reality of claim 1, wherein the mixed reality processing device receives and registers position and size information for an interactive object, detects whether the body of the user, which is detected by the depth camera overlaps with an area corresponding to the position and size of the interactive object, and adds, when the body and the interactive object overlap with each other, information indicating that the body and the interactive object overlap with each other to the output image information.

5. An implementation method of virtual reality using mixed reality, comprising:
   capturing, by a depth camera vertically installed on an upper surface of a chroma-key environment booth in which a chroma-key screen is formed in a space corresponding to a viewing range of a user, the user to generate depth image information;
   outputting, by a head mounted display (HMD) device worn on a head of the user, output image information from the outside by approaching both eyes of the user, wherein the HMD device has a stereoscopic camera, a head tracking marker, a direction sensor, and a HMD output unit, wherein the direction sensor is located between the two eyes of the user and configured to sense a direction of the user's head;
   capturing, by a stereoscopic camera installed at a position corresponding to the both eyes of the user and located in front of the HMD device, a front surface of the user, wherein the head tracking marker is formed on an upper end of the stereoscopic camera;
   detecting, by a mixed reality processing device, the head tracking marker positioned in the HMD device by receiving the depth image information and detecting a position and a rotation value of the head of the user in an actual environment, correcting the rotation value according to a direction sensing value detected by the direction sensor, applying the detected position value and the corrected rotation value to a virtual reality rendering camera for virtual reality generating output image information output to the HMD device to correspond to the position value and the corrected rotation value, overlaying image information for a body of the user, which is captured by the stereoscopic camera on the output image information, and matching a reference point in an actual environment, which is marked in the chroma-key environment booth and a reference point in the output image information for the virtual reality.

6. The implementation method of virtual reality using mixed reality of claim 5, wherein a space corresponding to the viewing range is acquired by adding a capturing angle of the stereoscopic camera to a predetermined angle.

7. The implementation method of virtual reality using mixed reality of claim 5, wherein the direction sensor is configured to detect a direction corresponding to a visual field of the user.

8. The implementation method of virtual reality using mixed reality of claim 5, wherein the mixed reality processing device
   receives and registers position and size information for an interactive object,
   detects whether the body of the user, which is detected by the depth camera overlaps with an area corresponding to the position and size of the interactive object, and
   adds, when the body and the interactive object overlap with each other, information indicating that the body and the interactive object overlap with each other to the output image information.

* * * * *